United States Patent
Dwyer et al.

(10) Patent No.: US 6,845,206 B2
(45) Date of Patent: Jan. 18, 2005

(54) INTERBAY HOUSING ASSEMBLY FOR FIBER OPTIC MANAGEMENT SYSTEMS

(75) Inventors: Thomas Dwyer, Greenville, SC (US); Gerald K. Creswell, Jr., Fountain, SC (US); Conley L. McGee, Simpsonville, SC (US); Gaines N. Massey, Simpsonville, SC (US); Kevin T. Monroe, Simpsonville, SC (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

(21) Appl. No.: 10/166,262

(22) Filed: Jun. 11, 2002

(65) Prior Publication Data

US 2003/0228121 A1 Dec. 11, 2003

(Under 37 CFR 1.47)

(51) Int. Cl.[7] .................................................. G02B 6/00
(52) U.S. Cl. ....................................... 385/134; 385/135
(58) Field of Search ......................................... 385/134

(56) References Cited

U.S. PATENT DOCUMENTS

| | | | |
|---|---|---|---|
| 5,758,002 A | 5/1998 | Walters ..................... 385/134 |
| 5,758,003 A * | 5/1998 | Wheeler et al. ............ 385/134 |
| 5,825,962 A | 10/1998 | Walters et al. ............. 385/135 |
| 6,102,214 A | 8/2000 | Mendoza ...................... 211/26 |
| 6,181,862 B1 | 1/2001 | Noble et al. ................ 385/135 |
| 6,223,909 B1 | 5/2001 | Mendoza ...................... 211/26 |
| 6,614,978 B1 * | 9/2003 | Caveney ..................... 385/135 |
| 2001/0002657 A1 | 6/2001 | Mendoza ...................... 211/26 |

* cited by examiner

Primary Examiner—John R. Lee
Assistant Examiner—Phillip A Johnston
(74) Attorney, Agent, or Firm—Tracey D. Beiriger

(57) ABSTRACT

Interbay housing assemblies for use with fiber optic management system racks, include a first enclosure having sidewalls, a rear opening and a plurality of front openings. Mounting brackets are attached to the sidewalls for attachment to adjacent equipment racks. Additional enclosures are positioned adjacent to the front openings. Each of the additional enclosures defines a slot for receiving cables. Each of the additional enclosures can include built-in radius control guides adjacent to the slot for receiving cables. A fiber optic cable management system including an interbay housing assembly positioned between two equipment racks is also disclosed.

9 Claims, 5 Drawing Sheets

US 6,845,206 B2

INTERBAY HOUSING ASSEMBLY FOR FIBER OPTIC MANAGEMENT SYSTEMS

FIELD OF THE INVENTION

This invention relates to fiber optic management systems, and more particularly to enclosures for use in interbay spaces in telecommunication racks.

BACKGROUND OF THE INVENTION

Fiber optic management systems provide termination and service access points for fiber optic circuits. Where a large number of fiber optic cables are to be connected, connections are typically made in fiber distribution frames. The frames can be comprised of multiple equipment racks that form bays for containing enclosures that contain fiber optic management components, such as splice boxes and connection modules. Opto-electronics equipment is modular to facilitate incremental service activation over time.

The interbay storage area in telecommunication rack systems is the space between two racks. It is typically used to route cables from one rack to another and to store slack cable. The space between frames is planned for, and the racks are typically spaced from 5 to 10 inches apart. Five inch spacing is most common, and is used for "vertical" cable access.

Most equipment frames are at capacity. As new services are deployed, there is not enough room on or off the equipment frames to facilitate the required fiber management (connection, protection and storage for fiber administration). The opto-electronics devices used to implement these new services require access (add/drop) to the network via fiber optic connections. Fiber management apparatus is generally located in the same proximity to provision, manage and implement fiber circuits/services. There simply isn't enough space on the frame, or space to add frames in these existing environments.

In a situation where the racks are full and the end user wants to expand there is no place to go without purchasing additional racks and housings which are expensive and may not be located near the equipment to which they must connect.

There is a need for an equipment panel that can be used to add capacity to fiber optic cable management racks without requiring the installation of additional racks.

SUMMARY OF THE INVENTION

Interbay housing assemblies for use with fiber optic management system racks, constructed in accordance with this invention comprise a first enclosure having sidewalls, a rear opening and a plurality of front openings. Mounting brackets are attached to the sidewalls for attachment to adjacent equipment racks. Additional enclosures are positioned adjacent to the front openings. Each of the additional enclosures defines a slot for receiving cables. Each of the additional enclosures can include built-in radius control guides adjacent to the slot for receiving cables.

Doors can be attached to the various enclosures. Means for mounting cable management devices can be provided in each of the front openings. Flanges extending from front edges of the additional enclosures provide additional cable protection.

The invention also encompasses fiber optic cable management systems comprising first and second equipment racks positioned to form an interbay space; and an interbay housing assembly positioned within the interbay space and including a first enclosure having sidewalls, a rear opening and a plurality of front openings, mounting brackets attached to the sidewalls for attachment to the first and second equipment racks, and a plurality of additional enclosures, each positioned adjacent to one of the front slots, and each defining an opening for receiving cables. A second interbay housing can also be positioned within the interbay space, or a filler panel can be mounted across a portion of the interbay space not occupied by an interbay housing.

DETAILED DESCRIPTION OF PREFERRED EMBODIMENTS

Figure 1:
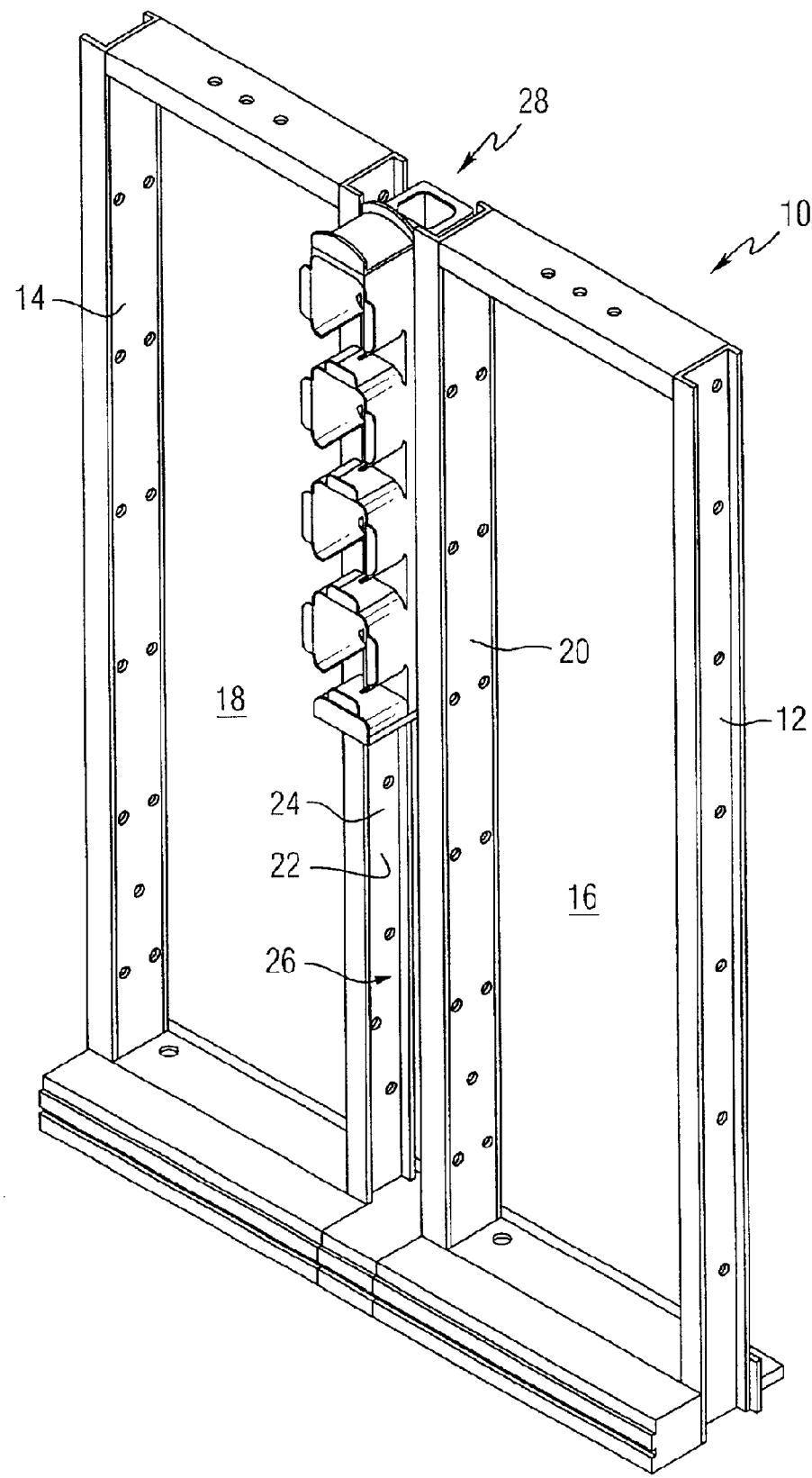
FIG. 1 is pictorial representation of a fiber optic management system constructed in accordance with this invention.

Referring to the drawings, FIG. 1 is a pictorial representation of a fiber optic management system 10 including first and second equipment racks 12 and 14. The racks define first and second bays 16 and 18 that are used to mount various fiber optic termination and connection panels. Sides 20 and 22 of the racks are separated by a space, called an interbay space 24, that is typically used for cable storage and routing of cables between racks. The interbay space can be covered by a panel that protects the cables positioned in the interbay space. Each rack includes a frame defining a bay formed between two spaced apart vertical sides. The interbay space forms a vertical channel 26 that is typically used to provide vertical management of input and output cables that cross connect between the racks. This invention provides an interbay housing assembly 28 that can be mounted in the interbay space.

Figure 2:
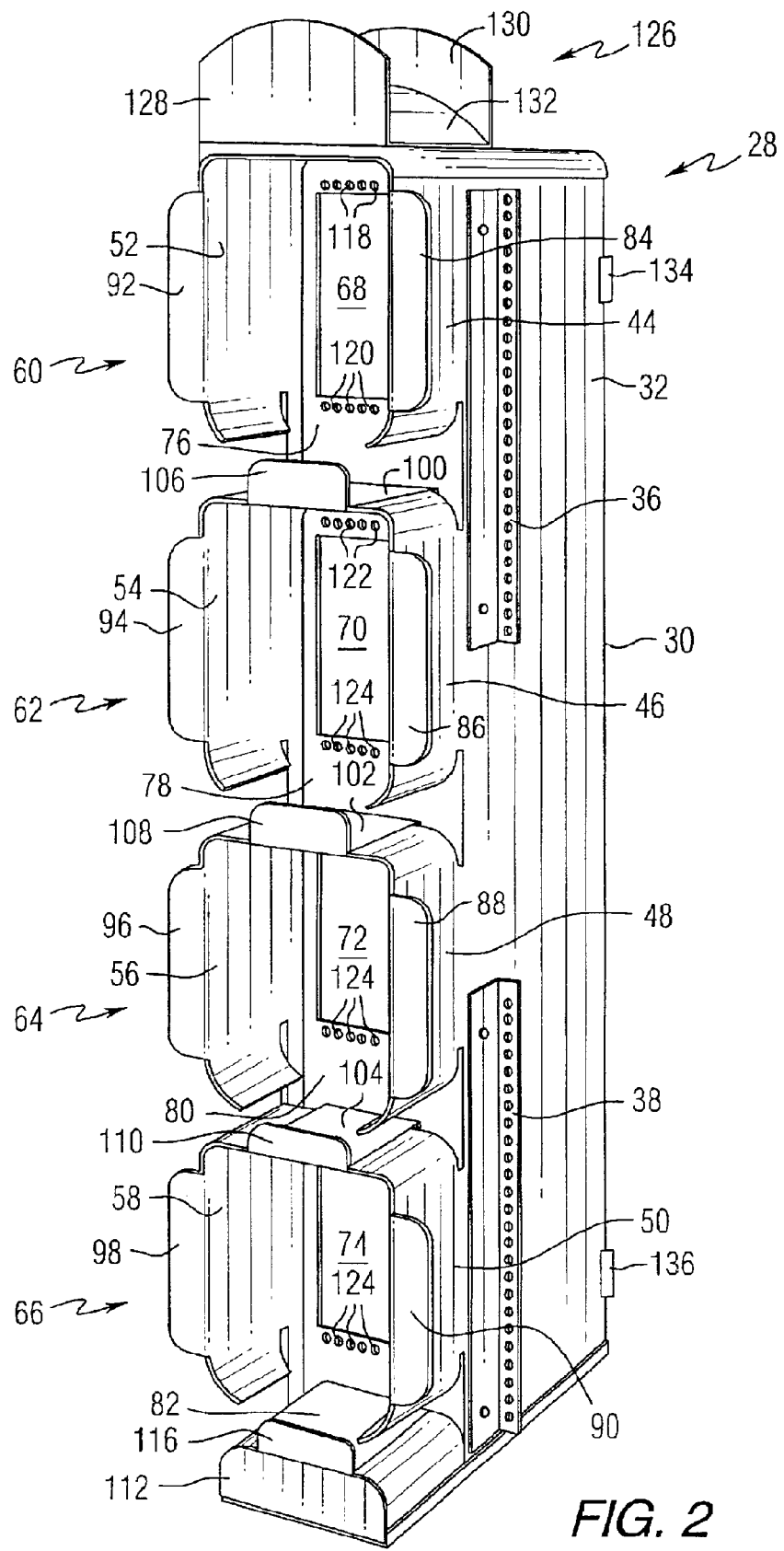
FIGS. 2 and 3 are perspective views of an interbay housing assembly constructed in accordance with the invention.
Figure 3:
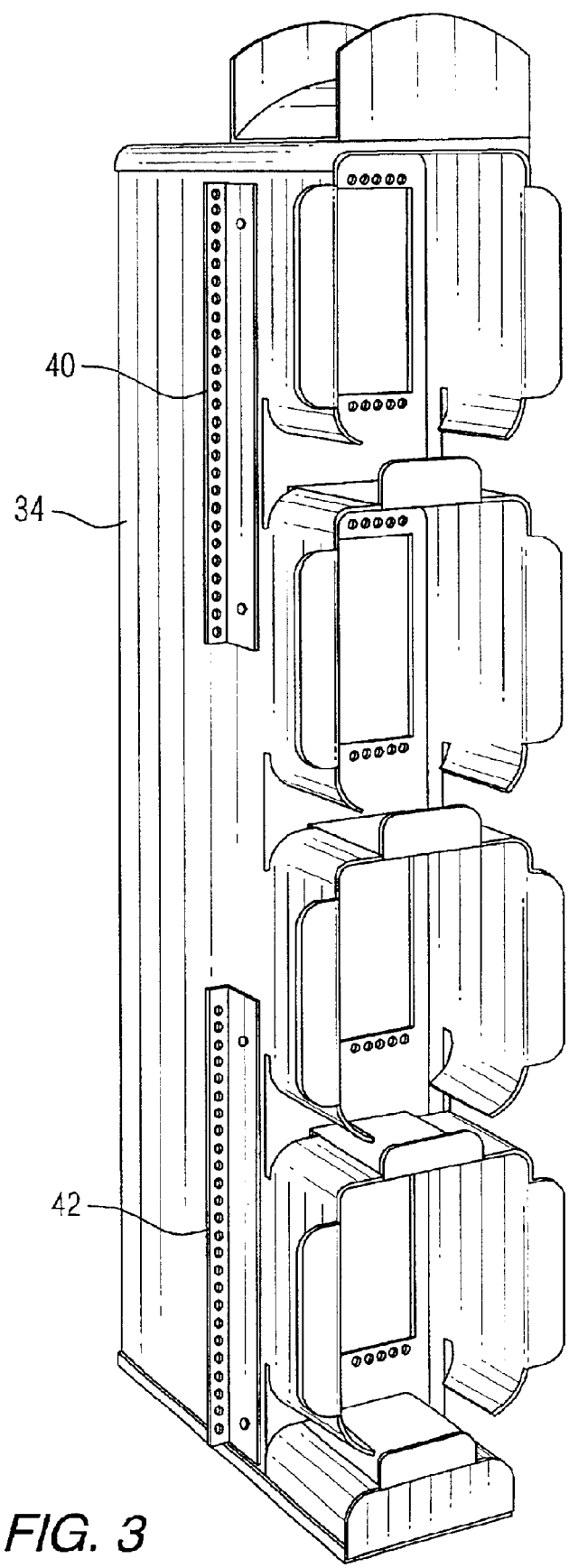

FIGS. 2 and 3 are perspective views of the interbay housing assembly 28. The assembly 28 includes a vertically elongated rear enclosure 30 that can be positioned between two racks. The enclosure includes sidewalls 32 and 34. Mounting brackets 36, 38, 40 and 42 are attached to the sidewalls and provide means for connecting the housing assembly to the adjacent racks. A plurality of extensions 44, 46, 48, 50, 52, 54, 56 and 58 extend from the sidewalls and form portions of front enclosures 60, 62, 64 and 66. The extensions form vertical cable troughs and provide fiber protection. Enclosures 60, 62, 64 and 66 are positioned adjacent to openings 68, 70, 72 and 74 in the enclosure 30. The openings 68, 70, 72 and 74 provide access to the enclosure 30 from the front of the housing assembly.

The enclosures 60, 62, 64 and 66 in the illustrated example are substantially rectangular in shape, with rounded corners. The extensions with rounded corners provide interbay slack cable storage and bend radius control. Openings, or slots, 76, 78, 80 and 82 are provided for cable entrance and exit from the bottom of the enclosures. Flanges 84, 86, 88, 90, 92, 94, 96 and 98 extend from the front edges of sides of the enclosures. Plates 100, 102 and 104 form the tops of enclosure 62, 64 and 66 respectively. Additional flanges 106, 108, and 110 extend from front edges of plates 100, 102 and 104. A base section 112 supports a plate 114 that includes a flange 116. The flanges, in combination with either adjacent structures, such as adjacent enclosures or the mounting brackets, form channels for routing cables. The rounded corners of the enclosures provide bend radius control for cables that extend into the enclosures from the channels. Openings 68, 70, 72 and 74 are provided in the back of each of the enclosures for passage of cables. While four front enclosures are shown in this example, a greater or smaller number of front enclosures could be used. In addition, multiple housings can be mounted in a single interbay space. For example, in FIG. 1, two housings could be mounted, one above the other, in the interbay space. Alternatively, if a single housing is used as shown in the FIG. 1, the remainder of the interbay space can be left open, or covered by a filler panel.

A plurality of holes, such as holes 118, 120, 122 and 124, are provided adjacent to the openings between the front enclosures and the rear enclosure, commonly referred to as a "bulkhead". Various types of cable management devices can be mounted in these openings using the adjacent holes. Such devices can be mounted in the enclosures using typical methods, such as screws or push latch mechanisms. In addition, the housing of this invention is not limited to double-wide modules. Single-wide modules can also be used.

An additional channel 126, formed by flanges 128 and 130 and a curved plate 132, is mounted on top of the assembly. Plate 132 can be used for cable routing and radius control of cables passing over it. Hinges 134 and 136 are shown as means for mounting a door on the rear enclosure.

Figure 4:
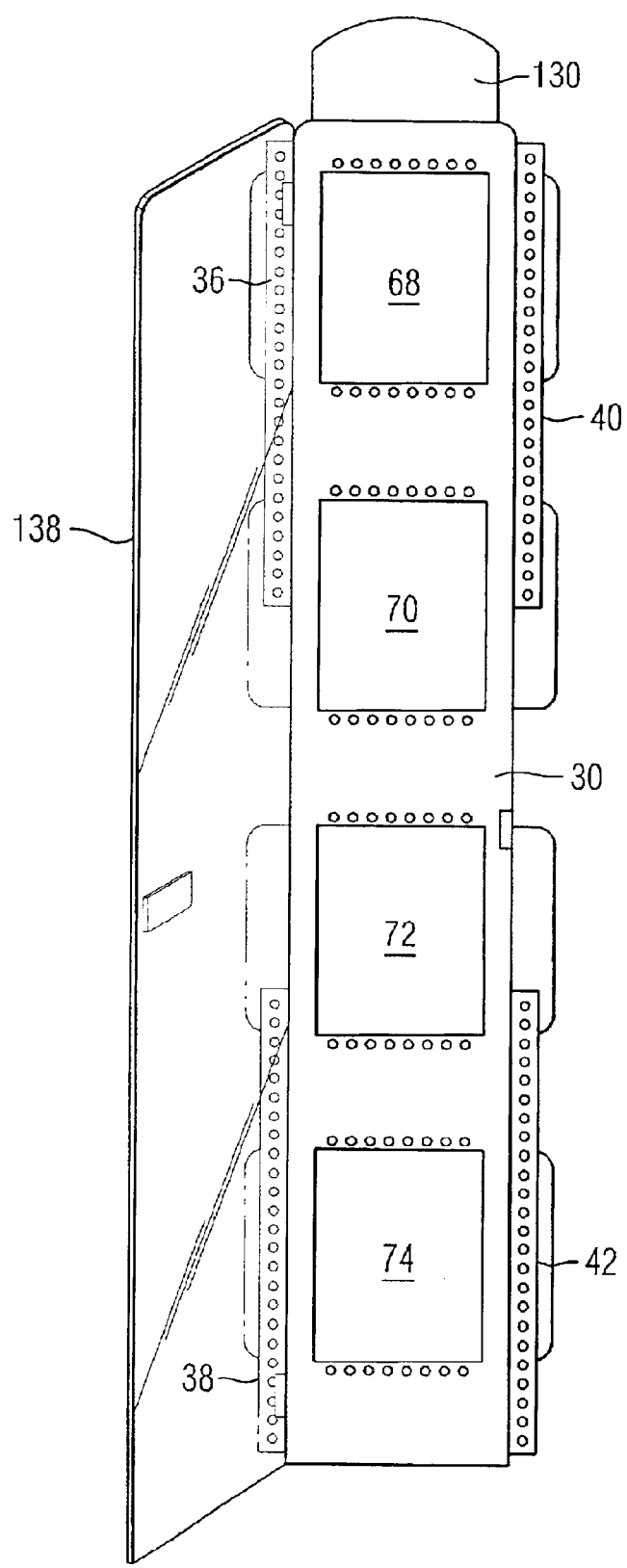
FIG. 4 is a rear perspective view of the interbay housing assembly of FIGS. 2 and 3.

FIG. 4 is a rear elevation view of the interbay housing assembly of FIGS. 2 and 3. In this view, the elongated rear housing 30 can be seen to include openings for passage of cables and rounded corners for cable bend radius control. A door 138 can be included for further protection of the contents of the housing.

Figure 5:
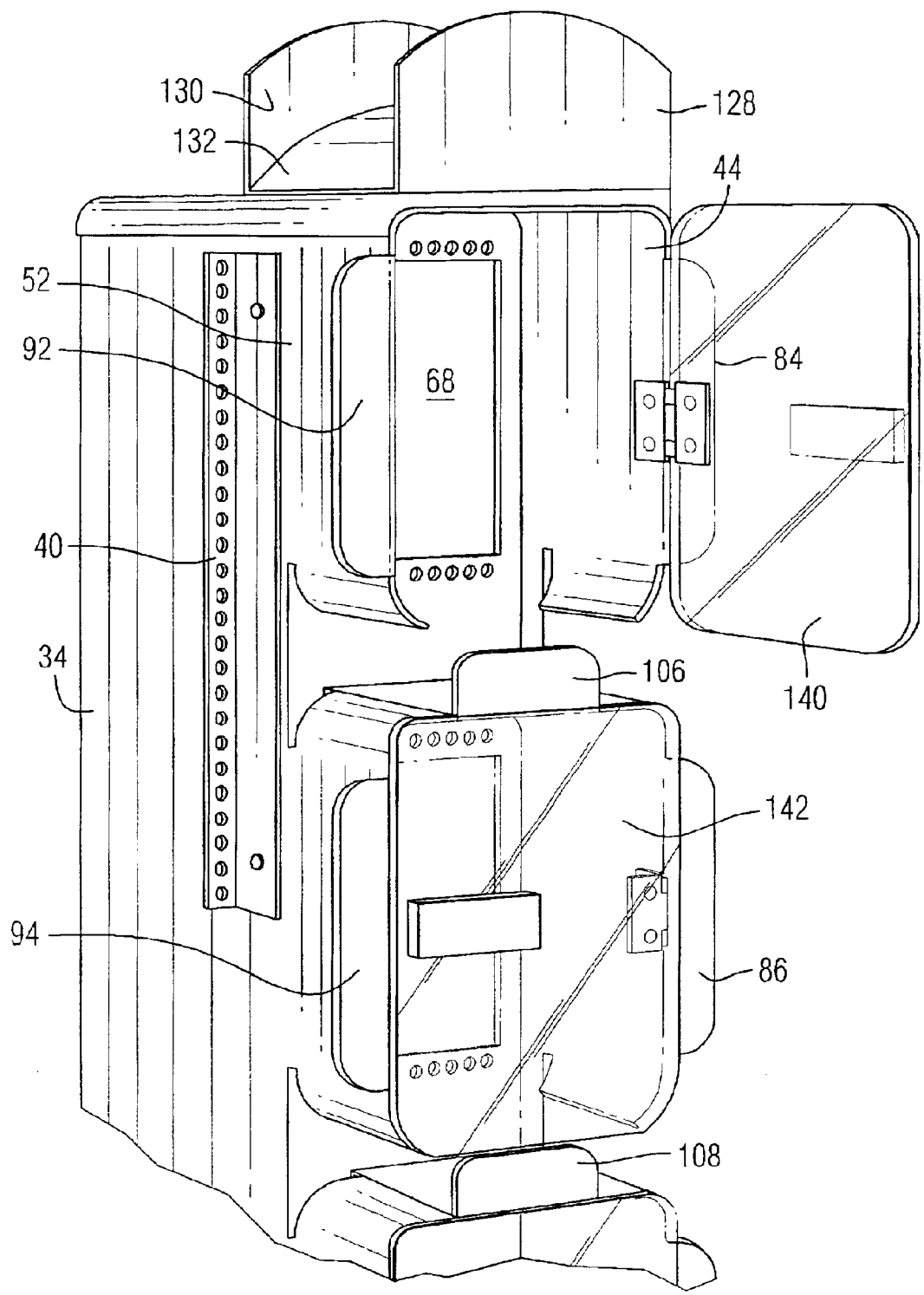
FIG. 5 is an enlarged perspective view of one of the front enclosures of the interbay housing assembly of FIG. 2.

FIG. 5 is an enlarged perspective view of the front of two of the enclosures of the interbay panel of FIGS. 2 and 3. This view shows that doors 140 and 142 can be attached to the front of the enclosures.

The invention permits the addition of fiber optic equipment when existing racks are at capacity or less. The interbay housing assembly is designed to use either modules common to the industry or individual adaptor plates with adaptors also common to the industry. The modules or adapter plates can be mounted in the openings 68, 70, 72 and 74 using the holes provided adjacent to the openings.

In one embodiment, the interbay housing assembly has a height of one half of the height of an equipment rack. In such case, two interbay housings can be used in tandem or one interbay housing can be used in combination with a filler plate.

Provisions are made for orderly routing of fiber optic cables or other cable types at the end users preference. These provisions are made in the front and rear enclosures of the assembly. In the rear of the assembly, cables may be routed out the bottom or the top of the housing, for example, through square openings/windows in the top and bottom. Cables can dress up or down behind within the housing behind the rear door. Provisions are also made for protection of the cables in the rear from falling debris, tool belts or pouches, or other means which may damage the delicate cabling. For example, the top can be semi-closed and a rear door contains and/or covers cables inside the enclosure.

Built-in radius control guides in the front are also incorporated into the design for proper bend radius of fiber optic cables or other cables. Doors can be provided on the various enclosures for ease of servicing individual modules or adaptors. The door can be removable or an integral part of the assembly. The rear of the assembly includes a large open area, inside the rear door, for attachment of large feeder cables to the entire rack or the interbay housing assembly. Provisions are also made for attachment of brackets that would take the place of the interbay storage mounting brackets that are normally provided to mount an interbay storage panel. Cable clamps can be added at numerous locations for orderly cable routing. For example, clamps can be added inside the front of the housing near the modules, outside the wall of the panel, or inside the rear door behind the modules. Cross connection cables can be routed between the modules. For example, the cross connection cables can exit out the bottom opening of a module, extend around the side flanges and back into the bottom opening of another module.

The invention provides an interbay housing assembly that can be positioned/installed between existing equipment rack frames to support both inter-connect and cross-connect functions, and can eliminate the need for additional frames. In addition to saving valuable real estate, the interbay storage housing will substantially reduce time, labor and equipment costs.

The advantage of placing the interbay housing assembly in the area normally occupied by an interbay storage panel is that an end user can now expand the fiber optic cable management system inexpensively using existing space without purchasing a new rack and associated equipment. The interbay housing assembly permits expansion of the fiber optic cable management system without compromising system integrity. Often times to expand a communications system, an end user has to place a new rack in any area available in the building. If the cross connects or connections that need to be made are not close, then extra cabling must be purchased which introduces additional losses or points of possible failure.

By using the interbay housing assembly, the end user can place equipment that needs to be connected together in close proximity using shorter cables. Typically racks are in the seven foot tall configuration which allows the end user to remove the interbay storage panel completely and use one interbay housing assembly singularly with a filler panel for aesthetic purposes, or in tandem with two interbay housing assemblies and no filler panels. Built in radius controls allow proper bend radii to be maintained during routing of cables. Protection of cables while installed is of paramount importance since damaged cable, if in use, would cause a disruption of service. The possibility of snagging cables with a tool or tool pouch exists. Dropping of tools into the cables from above is a very real possibility. Therefore protection of the cables is important. Having the mounting brackets attachable to the interbay housing assembly in place of the brackets which would normally hold an interbay storage panel helps to maintain the seismic rating of the rack and rack system.

Several options are available for placement of the modules or adapter plates in the assembly. Some of these options include vertical placement above each other or tandem (side by side) placement. A door in the rear of the panel may be incorporated for alternative cable protection and access. Fiber distribution frames that are modified to include the invention fit within the footprint of the previously existing frame.

This invention minimizes exposed cables, reduces cable stress, and maintains required bend radius. The assembly utilizes existing space between racks of fiber optic management systems and provides means for connection, protection and storage for fiber administration. The interbay housing assembly saves space, and reduces time, labor and equipment costs.

While the present invention has been described in terms of several examples, it will be apparent to those skilled in the art that various changes can be made to the disclosed examples without departing from the invention as defined by the following claims.

What is claimed is:

1. An interbay housing assembly for use with fiber optic management system racks including first and second equipment racks defining first and second bays, the racks positioned to form an interbay space, the housing assembly, mounted in the interbay space, comprising:

a first enclosure having sidewalls, a rear opening and a plurality of front openings;

mounting brackets attached to the sidewalls for attachment to adjacent equipment racks;

a plurality of additional enclosures, each positioned adjacent to one of the plurality of front openings, and each allowing for receiving cables; and a plurality of holes adjacent to the plurality of front openings for mounting cable management devices within the additional enclosures; and wherein said assembly is disposed between equipment racks.

2. An interbay housing assembly according to claim 1, wherein each of the plurality of additional enclosures includes built-in radius control guides adjacent to the slot for receiving cables.

3. An interbay housing assembly according to claim 1, further comprising:

a plurality of doors, each of the doors being attached on one of the plurality of additional enclosures.

4. An interbay housing assembly according to claim 1, further comprising:

a mounted cable management device in a plurality of the additional enclosures.

5. An interbay housing assembly according to claim 1, further comprising:

means for protecting cables in the assembly from falling debris.

6. An interbay housing assembly according to claim 1, further comprising:

a radius control guide on a top of the assembly.

7. An interbay housing assembly according to claim 1, further comprising:

means for routing cables out of the top and/or bottom of the first enclosure.

8. An interbay housing assembly according to claim 1, further comprising:

a plurality of flanges extending from front edges of the additional enclosures.

9. An interbay housing assembly according to claim 8, wherein adjacent ones of the additional enclosures are spaced such that one of the flanges of one of the additional enclosures covers a space between the additional enclosures.

* * * * *